United States Patent
Cato

(10) Patent No.: US 7,456,742 B2
(45) Date of Patent: Nov. 25, 2008

(54) APPARATUS AND METHOD FOR DETERMINING THE POSITION OF A MOBILE PLATFORM

(75) Inventor: Robert T. Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 11/467,990

(22) Filed: Aug. 29, 2006

(65) Prior Publication Data

US 2008/0061973 A1 Mar. 13, 2008

(51) Int. Cl.
*G08B 13/14* (2006.01)
(52) U.S. Cl. .............. 340/568.5; 340/686.1; 340/539.1; 340/539.13; 340/825.36; 340/825.49; 235/383; 235/385; 705/10; 705/14; 705/26

(58) Field of Classification Search .............. 340/568.5, 340/686.1, 539.1, 539.13, 825.36, 825.49; 235/383, 385; 705/1, 10, 14, 26
See application file for complete search history.

(56) References Cited

U.S. PATENT DOCUMENTS

| | | | |
|---|---|---|---|
| 4,882,724 A | 11/1989 | Vela et al. | |
| 5,627,524 A | 5/1997 | Fredrickson et al. | |
| 5,630,068 A * | 5/1997 | Vela et al. | 705/1 |
| 5,668,629 A | 9/1997 | Parker et al. | |
| 5,751,246 A | 5/1998 | Hertel | |
| 6,177,880 B1 * | 1/2001 | Begum | 340/5.9 |
| 6,780,077 B2 | 8/2004 | Baumgartner et al. | |
| 6,956,506 B2 | 10/2005 | Mantyjarvi et al. | |
| 7,183,910 B2 * | 2/2007 | Alvarez et al. | 340/539.13 |

* cited by examiner

*Primary Examiner*—Hung T. Nguyen
(74) *Attorney, Agent, or Firm*—Jason O. Piché

(57) ABSTRACT

A mobile platform such as a shopping cart, flatbed cart or lift truck is provided with a plurality of radiation detectors which are screened or limited in scope of view and which cooperate with circuitry which can distinguish from the interaction of the sensors with emitters the position of the platform. Position consists of location and orientation. Each detector or sensor is screened to limit its view to a defined portion of a sphere.

23 Claims, 4 Drawing Sheets

APPARATUS AND METHOD FOR DETERMINING THE POSITION OF A MOBILE PLATFORM

FIELD AND BACKGROUND OF INVENTION

This invention relates to determining the position of a mobile platform such as a cart within an environment such as a retail establishment, a warehouse facility, or other large area.

It has been recognized in the past that the ability to determine the position of a mobile platform such as a shopping cart within an area traversed by the platform is useful. As here used, "position" refers both the location, as on an X-Y coordinate grid, and orientation, as with reference to the cardinal points of the compass. Thus position defines both the coordinate grid location and the "pointing" of the cart in a particular direction for next forward movement.

An example of the usefulness of such information is found in prior U.S. Pat. No. 4,882,724 to Vela et al. As there taught, position information is used to provide a basis for shopper information such as the location of products within the establishment relative to the position of the shopping cart. Thus a shopper desiring milk can be directed to the location within a store where milk is on display.

A difficulty which arises with such prior apparatus and methods lies in changes in technology which employ infra red radiation sources and detectors to implement a location determining apparatus and method for shopping carts. In such apparatus and methods, the resolution available with known emitters located above the floor of a space can become challenging. It is this challenge which the present invention overcomes.

SUMMARY OF THE INVENTION

It is one purpose of this invention to enhance the effectiveness of location determining apparatus and method for mobile platforms such as shopping carts moving within a defined space such as the floor of a warehouse or retail establishment. This purpose is realized by providing on a cart a plurality of radiation detectors which are screened or limited in scope of view and which cooperate with circuitry which can distinguish from the interaction of the sensors with emitters the position of the cart. Each detector or sensor is screened to limit its view to a defined portion of a sphere.

BRIEF DESCRIPTION OF DRAWINGS

Some of the purposes of the invention having been stated, others will appear as the description proceeds, when taken in connection with the accompanying drawings, in which:

FIG. 3 further illustrates configurations of two and three receivers or sensors. Their respective screens and "footprints" as described more fully hereinafter;

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
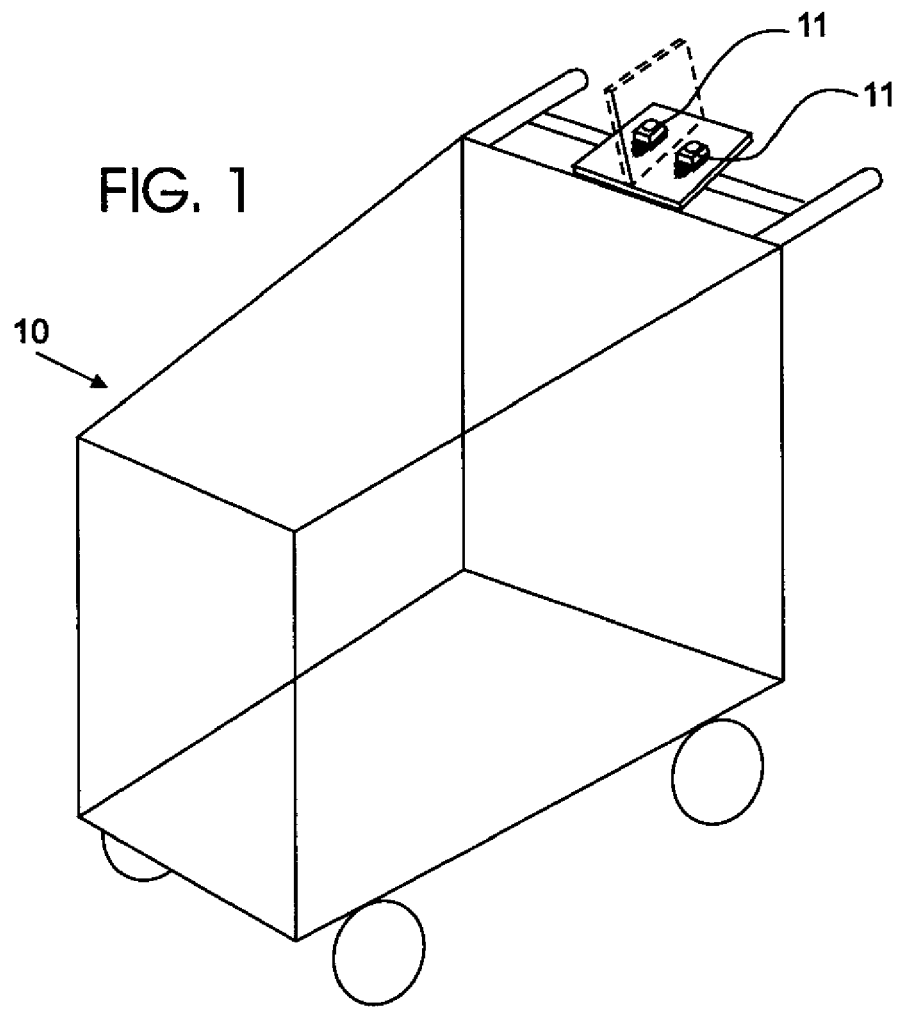
FIG. 1 is a perspective view of a mobile platform, in the form of a shopping cart, equipped with a plurality of radiation receivers as contemplated by this invention.
Figure 6:
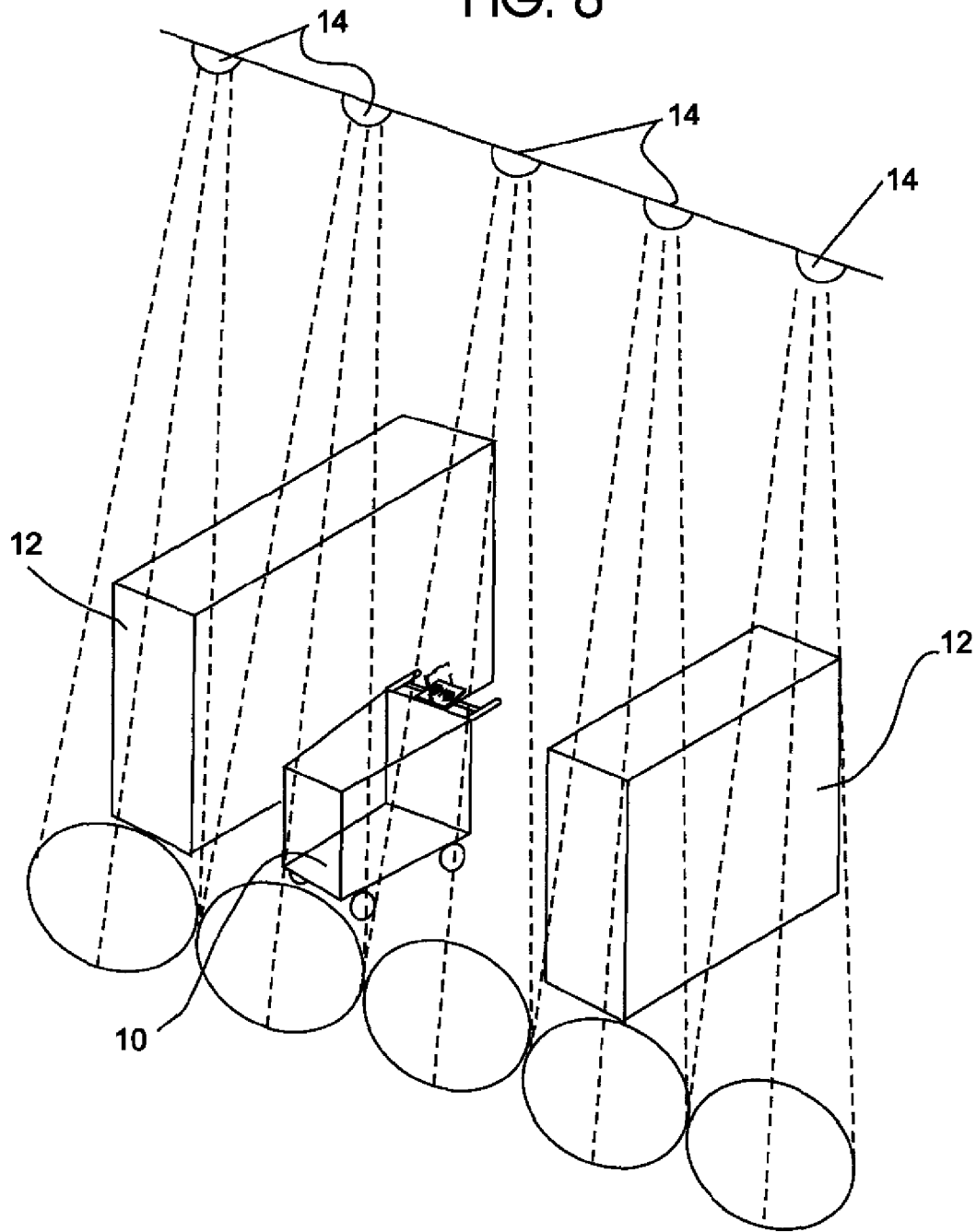
FIG. 6 is an environmental view showing the mobile platform of FIG. 1 in one environment of use of this invention.

Turning now to FIGS. 1 and 6, one form of mobile platform in accordance with this invention is there shown as a shopping cart 10. The shopping cart 10 has mounted thereon a plurality of radiation receivers 11 which are screened to limit the field of receptivity of each of the receivers to a defined portion of a sphere. While shown as a shopping cart, the mobile platform may take other forms contemplated by this invention, such as a flatbed cart, a lumber cart, or a fork lift truck used in various retail or commercial environments such as an office or warehouse stores offering quantity purchases, building materials and the like. The environment shown in FIG. 6 for the cart 10 is that of a grocery store or the like, where gondolas or display stands 12 are arranged on a sales floor while an array of radiation sources or emitters 14 are disposed in a ceiling or above the gondolas. Such an environment is known in the prior art, as for example in Vela et al U.S. Pat. No. 4,882,724 mentioned above. Here, the emitters 14 and receivers 11 preferably operate using infrared radiation (here also IR). The emitters 14 may be driven in such a manner as to provide a digitally encoded signal which specifically identifies individual emitters or defined areas of emitters or rows or columns of emitters, for purposes which will become more clear hereinafter.

The basic concept of the apparatus of FIGS. 1 and 6, and the methods of operation of the systems, is that an operator of the cart 10 may move through the space of the area beneath the emitters 14 while circuitry associated with the receivers tracks the position of the cart 10. Such position tracking enables and number of desired results, from providing product prompts to a user to providing information for customer analysis to store management to assisting with computerized checkout schemes. The present invention contemplates usefulness in all these manners and others not specifically mentioned here.

Figure 2:
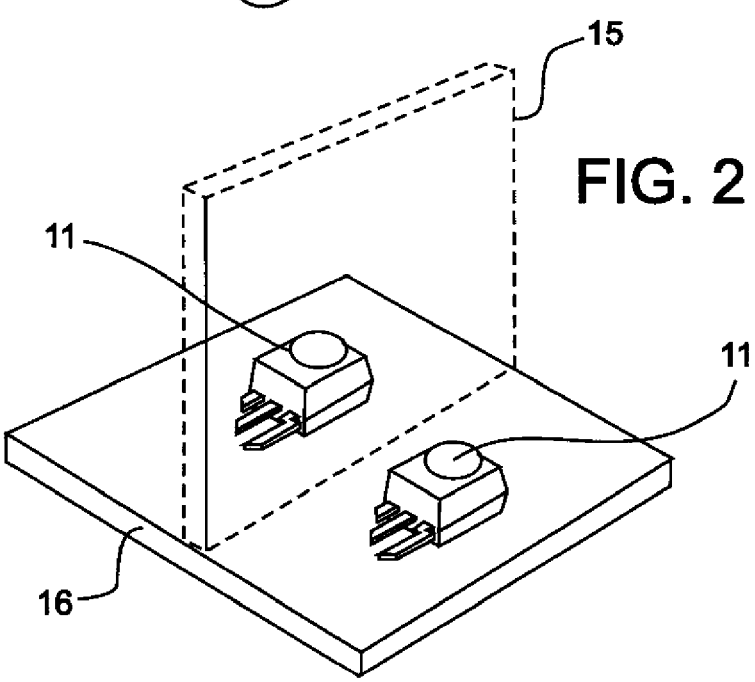
FIG. 2 is an enlarged scale perspective view of a pair of receivers as illustrated in FIG. 1, showing in phantom lines the positioning of the screen or blinder which limits the field of view of the receivers.

In accordance with important features of this invention, the screening of the field of view of the receivers and the circuitry associated with the receivers cooperate in an advantageous way to distinguish among a plurality of patterns of reception of radiation at the receivers 11 and identify a position of the platform 10 relative to the emitters 14 based upon recognition of said patterns of reception. FIG. 2 illustrates the positioning of a screening partition 15 between two receivers 11 in such a way as to limit the field of view of each of them to a defined portion of a sphere. More particularly, where there are two receivers 11 and a single screen or blinder 15 (FIG. 2), the view is limited to approximately one quarter of a sphere centered on the intersection of the screen 15 with the support 16 for the receivers (about one half of the hemisphere above the blinder 15). This limitation of the field of view is an important characteristic of this invention and distinguishes this invention from prior arrangements.

Figure 3:
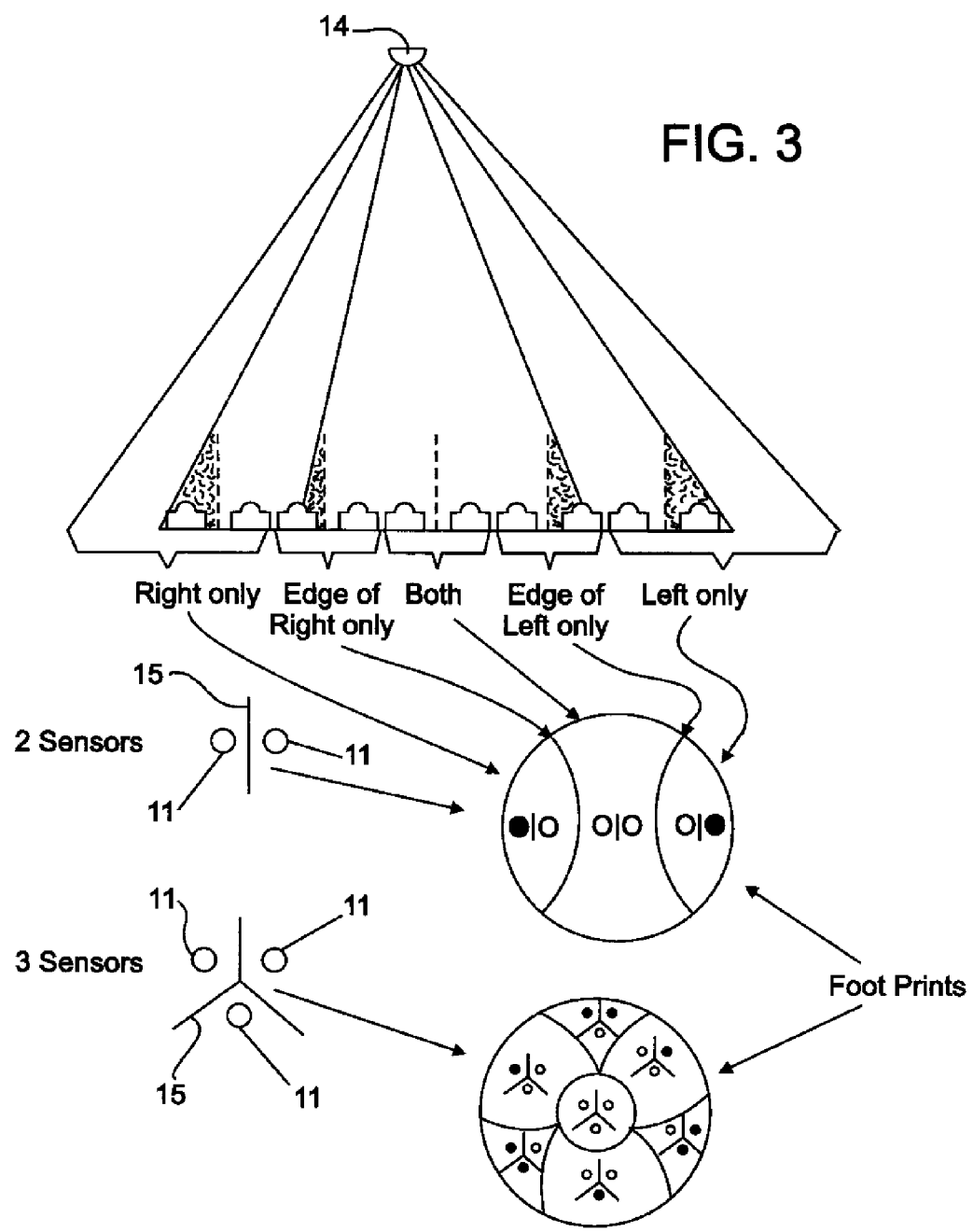
FIG. 3 is a simplified vertical elevation view showing the relationships between an overhead IR emitter and the IR illumination striking a receiver assembly of FIG. 2 when the location of the receiver is changed in relation to the IR emitter.

This effect is made more clear from FIG. 3, where the effect of movement of the cart beneath an emitter 14 is suggested. There, it will be seen that positioning the receivers directly beneath an emitter (the position marked as "both") causes the two receivers of FIGS. 1 and 2 to be equally exposed to the radiation emitted from above. Positioning the receivers near the edge of the emitted beam causes the one of the two receivers in FIGS. 1 and 2 to be exposed to the radiation emitted from above while the other is not because it is in the shadow of the blinder 15.

The IR emitter directs illumination downwardly in a cone, illuminating a first circular area on the floor below. The elements of the receiver 11 are mounted in a plane. The intersection of that plane and the cone of illumination is a second circular area, referred to herein as the "footprint" of the emitter. The circular footprint is divided into zones, with each zone representing the locations at which there is a particular pattern of illumination and/or shadowing of the sensors 11 for a particular orientation of the mobile platform. This is shown also by the portion of FIG. 3 identified as showing 2 sensors, where two receivers 11 and a single screen 15 are shown. The circular representation shows what occurs as the cart may be moved to the left and to the right of a vertical position directly beneath an emitter, as either the left or the right receiver "goes dark" or is screened from a view of the emitter. A receiver exposed to the emitter is shown as a circle, while a receiver screened from exposure to the emitter is shown as a dot.

An orientation arrangement is needed to uniquely determine a physical location because more than one location can produce the same illumination pattern if the cart's orientation is changed. For example, a two sensor system will produce the same pattern with the mobile platform facing north or south, if the location is changed to the opposite side of the emitter's centerline.

Another portion of FIG. 3 illustrates an array of receivers which has three receivers 11 and a screen element 15 which, in a simple vertical down looking view from above, appear to divide a circle into three parts of one hundred twenty degrees rather than the two one hundred eighty degrees semicircles of the two receiver configuration. With three receivers and a trilateral screen (illustrated in the lower portion of FIG. 3), the field of view of each receiver is limited to approximately one sixth of a sphere. The footprint of such an arrangement is also shown in FIG. 3.

Figure 4:
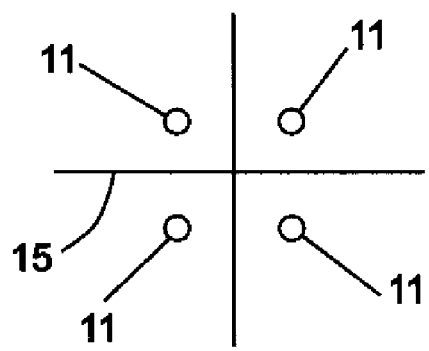
FIG. 4 is a view similar to a portion of FIG. 3 illustrating a configuration of four receivers and their associated screen.
Figure 5:
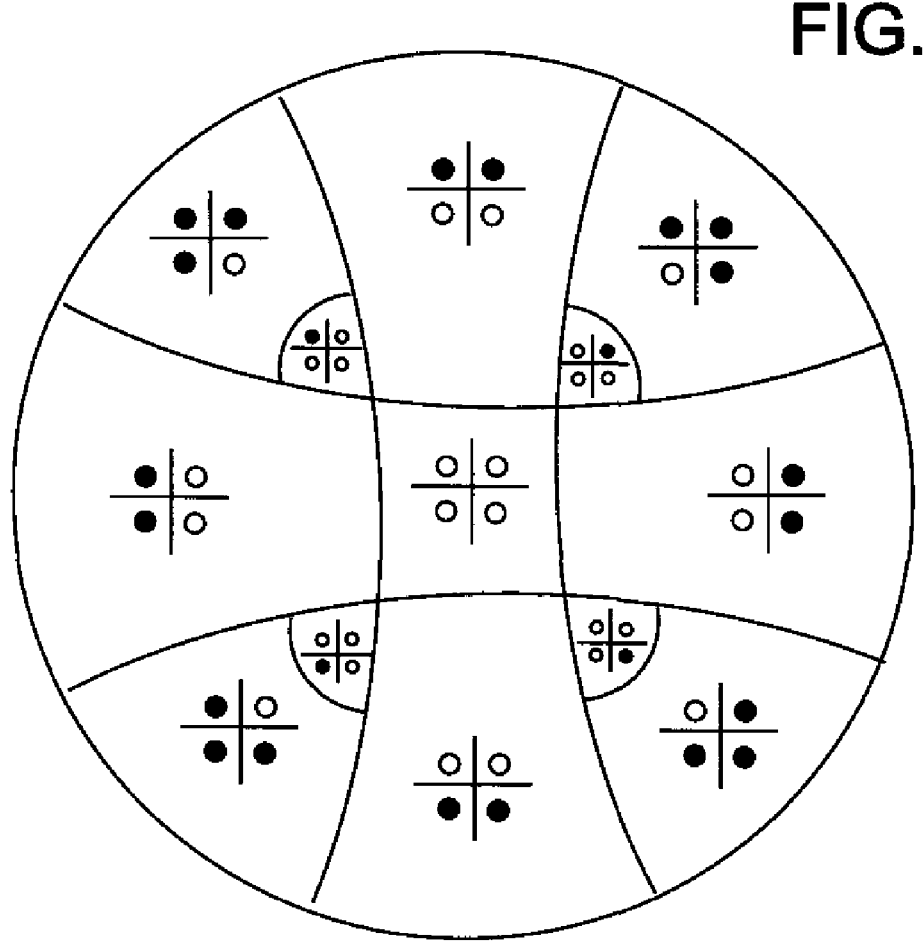
FIG. 5 is a view similar to portions of FIG. 3 illustrating the "footprint" of the four receivers.

FIGS. 4 and 5 show an array of receivers 11 where four receivers are provided and the screen divides a circle into four quadrants of ninety degrees. In such an arrangement, each receiver has its field of view limited to approximately one eighth of a sphere and the footprint appears as in FIG. 5. As is more clear from consideration of these forms of the present invention in which more than two receivers are shown, but as is also true of the simpler forms and FIG. 3, the screening of the fields of view will result in the fields of view of receivers overlapping to at least some degree.

As mentioned above, position includes at least two elements—location and orientation. The circuitry operatively associated with the receivers can distinguish both characteristics in one of several possible ways. One approach is to include in the circuitry an orientation device such as a solid state compass or device responsive to magnetic directions. Such a device would enable an input indicative of orientation of the cart 10 relative to the cardinal points of the compass. Another approach would use the possible digital encoding of emitter signals and the differentials in reception at the receivers to distinguish orientation relative to a plurality of receivers, particularly where the ceiling array is such that the array of receivers could view and respond to a plurality of emitters at any given position. In this instance, considering the footprint of, for example, a four receiver array, one receiver might be illuminated by one emitter (for example the receiver in the upper right quadrant of FIG. 5) while another (for example the receiver in the lower left quadrant of that array) is illuminated by a differently encoded emitter. The associated circuitry could then distinguish between these patterns to determine not only location but also orientation. As yet another alternative, the circuitry could include an inertial device which internally tracks movement of the cart.

In practice of methods in accordance with this invention, the processes include mounting a plurality of radiation receivers on a mobile platform; screening each of the receivers to limit the field of receptivity thereof to a defined portion of a sphere; distinguishing among a plurality of patterns of reception of radiation at the receivers; and identifying a position of the platform relative to the radiation sources based upon recognition of the patterns of reception. More detailed steps possible are believed to be clear from the apparatus discussion given above.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
    a mobile platform;
    a plurality of radiation receivers mounted on said platform and screened to limit the field of receptivity of each of said receivers to a defined portion of a sphere; and
    circuitry operatively connected to said receivers for distinguishing among a plurality of patterns of reception of radiation at said receivers and identifying a position of said platform relative to said radiation sources based upon recognition of said patterns of reception.

2. Apparatus according to claim 1 wherein said mobile platform is a shopping cart.

3. Apparatus according to claim 1 wherein said plurality of radiation receivers comprises two receivers.

4. Apparatus according to claim 3 further comprising a blinder assembly limiting the field of view of each receiver to approximately one quarter of a sphere.

5. Apparatus according to claim 1 wherein said plurality of receivers comprises three receivers.

6. Apparatus according to claim 5 further comprising a blinder assembly limiting the field of view of each receiver to approximately one sixth of a sphere.

7. Apparatus according to claim 1 wherein said plurality of receivers comprises four receivers.

8. Apparatus according to claim 7 further comprising a blinder assembly limiting the field of view of each receiver to approximately one eighth of a sphere.

9. Apparatus according to claim 1 wherein differing radiation source information received from two sensors is combined with a known physical relationship between the sources to determine the orientation of the mobile platform.

10. Apparatus according to claim 1 further comprising an orientation device mounted on said mobile platform and operatively coupled to said circuitry and cooperating therewith in determining the orientation of said platform relative to the cardinal compass points of as an element in identification of the position of said platform.

11. Apparatus according to claim 10 wherein differing radiation source information received from two sensors is combined with a known physical relationship between the sources to validate the orientation of the mobile platform.

12. Apparatus according to claim 1 wherein the field of view of each of the plurality of receivers overlaps with a portion of the field of view of another one of said plurality of receivers.

13. Method comprising:
mounting a plurality of radiation receivers on a mobile platform;
screening each of the receivers to limit the field of receptivity thereof to a defined portion of a sphere;
distinguishing among a plurality of patterns of reception of radiation at the receivers; and
identifying a position of the platform relative to the radiation sources based upon recognition of the patterns of reception.

14. Method according to claim 13 wherein the mounting of receivers comprises mounting the receivers on a shopping cart.

15. Method according to claim 13 wherein the mounting of receivers comprises mounting two receivers on a platform.

16. Method according to claim 15 wherein the screening of the receivers comprises mounting a blinder assembly limiting the field of view of each receiver to approximately one quarter of a sphere.

17. Method according to claim 13 wherein the mounting of receivers comprises mounting three receivers on a platform.

18. Method according to claim 17 wherein the screening of the receivers comprises mounting a blinder assembly limiting the field of view of each receiver to approximately one sixth of a sphere.

19. Method according to claim 13 wherein the mounting of receivers comprises mounting four receivers on a platform.

20. Method according to claim 19 wherein the screening of the receivers comprises mounting a blinder assembly limiting the field of view of each receiver to approximately one eighth of a sphere.

21. Method according to claim 13 further comprising determining the orientation of said platform relative to cardinal compass points as an element in identification of the position of said platform.

22. Method according to claim 13 wherein differing radiation source information received from two sensors is combined with a known physical relationship between the sources to infer the orientation of the mobile platform.

23. Method according to claim 13 wherein the mounting of the receivers comprises arranging the receivers so that the fields of view of each receivers overlaps with a portion of the field of view of another receiver.

* * * * *